Feb. 27, 1940. J. H. JOHNSON 2,191,829
MEANS FOR MAKING STRIPED RUBBER ROPE
Filed July 12, 1937 2 Sheets-Sheet 2
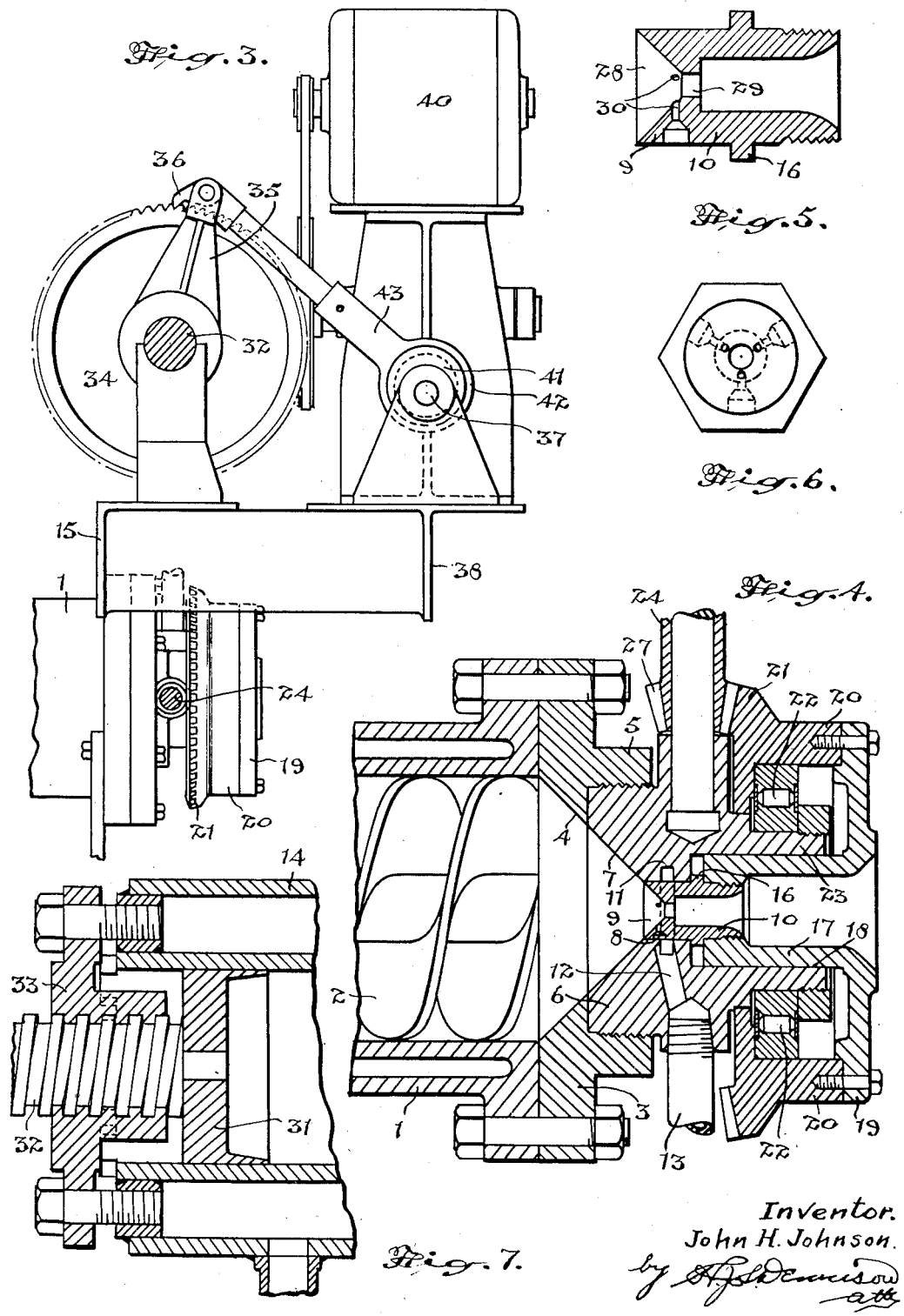
Inventor.
John H. Johnson.

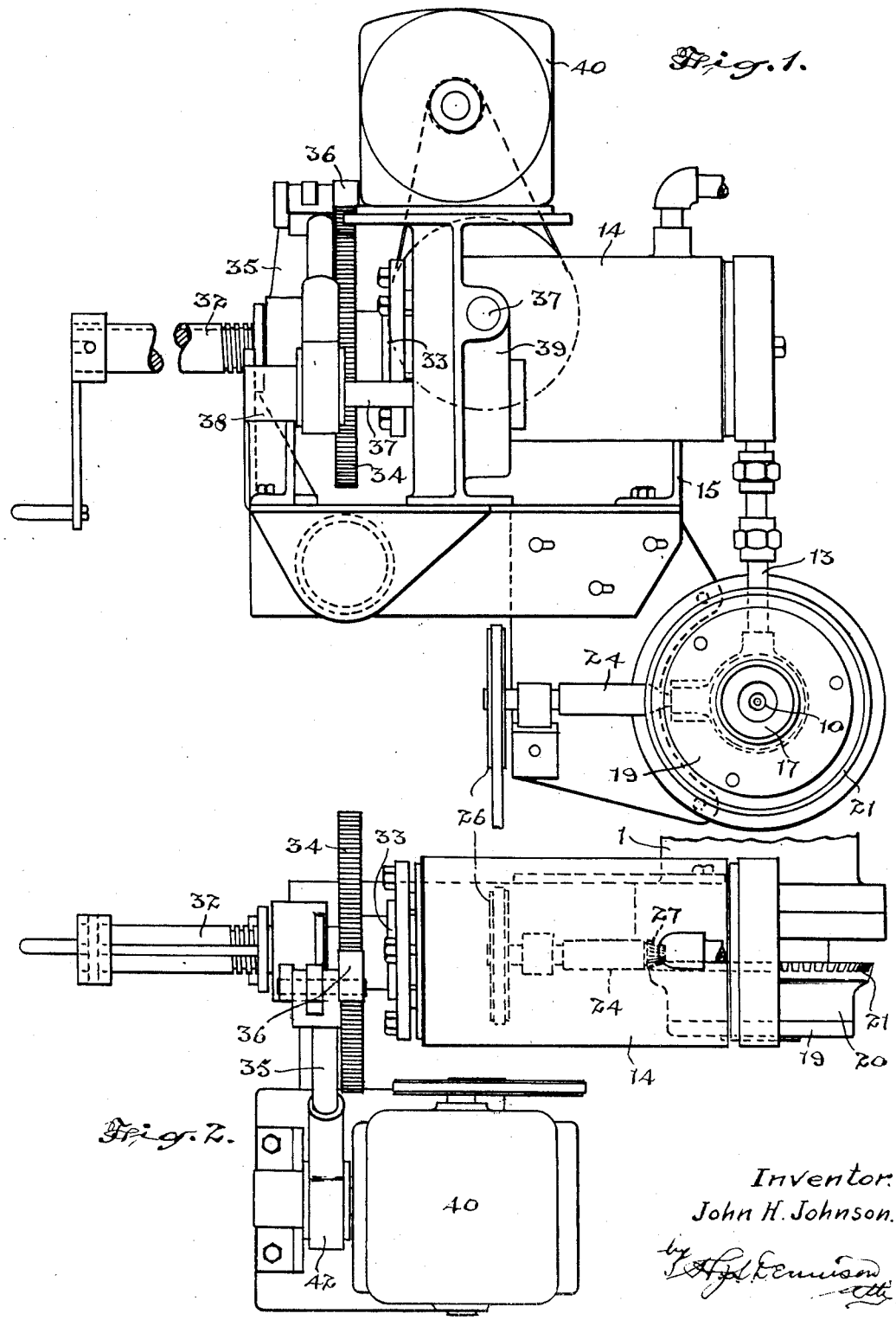

Patented Feb. 27, 1940

2,191,829

UNITED STATES PATENT OFFICE 2,191,829

MEANS FOR MAKING STRIPED RUBBER ROPE

John H. Johnson, Toronto, Ontario, Canada, assignor to The K & W Rubber Corporation, Delaware, Ohio Application July 12, 1937, Serial No. 153,076

7 Claims. (Cl. 18—13)

The principal objects of the invention are to provide a machine for manufacturing rubber rope economically and which will apply a rubber material in narrow stripes upon the periphery of the rope to be united with the main body of the rope material and to produce such striping in spiral form to enhance the appearance of the rope which is principally adapted for play or amusement purposes in the form of skipping ropes.

The principal features of the invention consist in the novel construction of the die through which the rubber material is extruded from a pressure cylinder whereby a plurality of small streams of rubber are fed on to the periphery of the rubber at the mouth of the rope forming die.

A further feature consists in the novel means for rotating the die to facilitate the extrusion of the rubber and to impart a uniform twist to the rubber as it is extruded to produce a spiral effect to the narrow strips of rubber applied at the mouth thereof.

A still further feature of importance consists in the novel construction of apparatus for feeding the striping rubber at a uniform rate of flow and with a pressure to ensure the even flow of the striping rubber into the die against the pressure of extrusion of the main flow of the rubber forming the body of the rope.

In the accompanying drawings Figure 1 is an elevational view of the apparatus looking into the mouth of the extrusion die.

Figure 2 is a top plan view of the structure shown in Figure 1.

Figure 3 is an elevational view of the structure taken from the left hand end.

Figure 4 is an enlarged sectional detail view of the extruding die and its operating parts with the adjacent end of the main pressure cylinder for feeding the rubber into the die.

Figure 5 is an enlarged longitudinal section of the die.

Figure 6 is an elevational view of the left hand end of the die as shown in Figure 5.

Figure 7 is an enlarged sectional detail of the operative end of the cylinder and piston for feeding the rubber to the plurality of lateral orifices of the die which form the stripes.

In the manufacture of rubber rope such as used for skipping ropes it is highly desirable to produce a rubber strip of circular cross section and of uniform size and it is also desirable to ornament the strip with narrow stripes of a colour contrasting with that of the body portion and to have such stripes arranged in uniform spirals.

In the apparatus herein shown the steam jacketed cylinder 1 which is only shown in part is provided with a spiral feed screw 2 which feeds the rubber stock to form the body of the rope to a head 3 which is formed with a converging orifice 4. The head 3 is provided with an internally threaded flange 5 in which is secured a block 6 having a converging orifice 7 forming a continuation of the orifice 4. The orifice 7 leads to a cylindrical axial orifice 8 into which the cylindrical end 9 of the die 10 extends with a rotating fit.

An annular channel 11 is formed in the block 6 intermediate of the length of the cylindrical orifice 8 which is closed by the portion 9 of the die. A passage 12 extends radially outward from the channel 11 and communicates with a pipe 13 which leads to the feed end of a steam jacketed cylinder 14 which is here shown mounted on a bracket 15 supported from the cylinder 1.

The die 10 is formed with a flange 16 which abuts the block 6 at the outer end of the orifice 8 and said flange also abuts the end of a sleeve 17 which is rotatably mounted in a cylindrical orifice 18 at the outer end of the block 6. The sleeve 17 is formed with a flange 19 at its outer end which is secured to the flange 20 of a bevel gear 21 mounted on roller bearings 22 which encircle the cylindrical end 23 of the block 6.

A spindle 24 journalled at one end in a bearing 25 in the block 6 is rotated by suitable means, here shown as a belt-driven pulley 26 and it operates a bevel pinion 27 which meshes with the bevel gear 21. The die 10 carried by the sleeve 17 is thereby rotated in its bearing at the end of the cylinder 1.

The inward end of the die 10 is formed with an orifice 28 converging from the converging orifice 7 of the block 6 to the circular orifice 29 which forms the extrusion orifice. A plurality of small holes 30 are bored through the die to enter the converging orifice 28 close to the extrusion orifice 29. The holes 30 are enlarged at their outer ends and communicate with the annular channel 11 and permit the entry of plastic rubber forced through the pipe 13 from the cylinder 14 and the narrow streams of rubber thus introduced on the periphery of the rubber mass being forced through the die by the feed screw 2 lie along the surface of the circular strip formed by the die. The holes 30 are spaced apart a desired distance and are of a suitable size to produce the desired striping effect with a rubber material of a colour contrasting with that contained in the cylinder 1.

The volume of rubber required to be fed through the holes 30 is extremely small in comparison to the amount of the body-forming rubber forced through the die from the cylinder 1 and this striping rubber is forced from the cylinder 14 by a piston 31 mounted on a screw spindle 32 which is threaded in the head 33.

A ratchet wheel 34 splined on the spindle 32 is mounted between bearings supported on the bracket 15 and an arm 35 is rotatably mounted on the shaft and supports a pawl 36 which engages the toothed periphery of the ratchet wheel 34.

A shaft 37 mounted in suitable bearings carried by a bracket extension 38 from the bracket 15 is operated by a suitable form of reduction gearing enclosed in the case 39 and is operated by a motor 40.

An eccentric 41 mounted on the shaft 37 is encircled by a ring 42 on one end of a rod 43 and the opposite end of said rod is pivotally connected to the pawl arm 35 so that said pawl arm is operated by the eccentric sheave to oscillate the pawl arm and to slowly rotate the threaded spindle 32 so that said spindle moves slowly in a longitudinal direction to force the piston against the plastic rubber filling the cylinder 14 and thereby forcing it into and through the orifices in the die.

It will be understood that the plastic rubber thus forced through the small orifices of the die will be carried through the forming orifice with the mass of body material and at a uniform speed and the narrow streams will be laid in the mass.

The die head may be rotated at any desired speed in relation to the speed of flow through the forming orifice in order to give the desired spiral effect to the striping.

In operating this device the cylinder 14 is filled with the coloured rubber stock for making the stripes and it is then closed and pressure is applied thereto until the material starts to feed through the openings 30.

Rubber stock to form the body of the rope is fed into the cylinder 1 and it is forced into the mouth of the die and contracted to the diameter of the extrusion orifice and picking up the striping stock as it moves into said extrusion orifice the striping stock is embedded therein and as the die is rotated through the operation of the gears 27 and 21 it assists the flow and coincidently imparts a uniform spiral to the stripes.

It will be understood that the forming die may be easily and quickly removed by unfastening the bolts extending through the flange of the rotatable member 17 and withdrawing same and a die with a larger or smaller extrusion orifice placed therein without disturbing the mounting of the bevel gear 21.

The annular channel is filled with the striping material and being fed from the one source it feeds the material uniformly through the several feed holes 30.

It will also be appreciated that many variations in the mechanical structure may be made without departing from the principal features which are to extrude the body material through a die and simultaneously force narrow strips of striping material into the body material and to rotate the die concurrently to assist the flow of the rubber through the forming orifice and to apply a twist to the article being produced resulting in the application of spiral striping to the rope produced which will be embedded in and form an integral part of same.

While the device is described as being preferably operated with the extruding die rotating, it will be understood that if desired, the die may be held stationary and form a rope with straight stripes.

What I claim as my invention is:

1. A machine for making striped rubber rope comprising a pressure cylinder formed with a chamber converging at one end to a die opening, the wall of said die opening having an annular feed channel therein, a cylindrical die fitted in said die opening and having sealing engagement with the wall of the die opening at each side of said annular feed channel, said die having an axial extrusion orifice and a plurality of radial passages communicating with said annular channel between said points of sealing engagement and leading inwardly to said extrusion orifice, means within said pressure cylinder for forcing rubber material through the extrusion orifice of said die, and means for forcing rubber material into said annular channel and through said radial passages.

2. In a machine for making striped rubber rope, a pressure cylinder formed with a chamber converging at one end to a cylindrical die opening, the cylindrical wall of which has an annular feed channel formed therein intermediate of its length leaving a cylindrical surface each side of the annular feed channel, a sleeve member rotatively mounted on said cylinder in axial alignment therewith, an extrusion die secured in said sleeve member and having an axial opening, said die extending into said cylindrical die opening and having radial holes extending inwardly from the periphery of the die to the axial opening and communicating at the outer ends with said annular channel, said die being cylindrically surfaced on opposite sides of said radial holes to rotatably and sealingly cooperate with the cylindrical surfaces of the die opening at the respective sides of the said channel.

3. In a machine for extruding longitudinally striped rubber rope, an extruding head having a die orifice, an annular die driving member rotatably mounted on and encircling said head concentrically of the die orifice, an extrusion die rotatably mounted in said die orifice, means for feeding contrasting materials in converging paths to said die orifice, and means forming a detachable drive connection between said die-driving member and the die whereby the die may be changed without de-mounting said die-driving member, said detachable drive means including a sleeve member rotatably recessed into the die head concentrically of the die orifice and die-driving member and having a flange abutting and detachably bolted to said die-driving member.

4. A machine for making striped rubber rope comprising a pressure cylinder formed with a chamber converging at one end to a die opening, the wall of said die opening having an annular channel therein, a cylindrical die fitted in said die opening having an axial extrusion orifice and a plurality of radial passages communicating with said annular channel and leading inwardly to said extrusion orifice, means within said pressure cylinder for forcing rubber material through the extrusion orifice of said die, means for forcing rubber material into said annular channel and through said radial passages, said latter means including a second pressure cylinder connected with said annular channel, means operable independently of the pressure means operating in the first mentioned cylinder, including a displacement member in the second mentioned cylinder to apply pressure to the rubber therein to force same through the annular channel and passages in said die, and ratchet drive means for said displacement member.

5. A machine for making striped rubber rope comprising a pressure cylinder formed with a chamber converging at one end to a die opening, the wall of said die opening having an annular channel therein, a cylindrical die fitted in said die opening having an axial extrusion orifice and a plurality of radial passages communicating with said annular channel and leading inwardly to said extrusion orifice, means within said pressure cylinder for forcing rubber material through the extrusion orifice of said die, means for forcing rubber material into said annular channel and through said radial passages, said latter means comprising a second pressure cylinder connected with said annular channel and having a head, a piston in said latter cylinder, a threaded spindle threaded through the head of said latter cylinder and rotatably connected to the piston, a ratchet wheel operatively connected with said spindle, a ratchet co-operating with said ratchet wheel, and independently controlled means for operating said ratchet.

6. A machine for making striped rubber rope comprising a pressure cylinder formed with a chamber converging at one end to a die opening, the wall of said die opening having an annular channel therein, a cylindrical die fitted in said die opening having an axial extrusion orifice and a plurality of radial passages communicating with said annular channel and leading inwardly to said extrusion orifice, means within said pressure cylinder for forcing rubber material through the extrusion orifice of said die, means for forcing rubber material into said annular channel and through said radial passages, said latter means including a second pressure cylinder connected with said annular channel, said latter cylinder having a head, a spindle threaded axially in the head of said latter cylinder, a piston mounted on said spindle, a ratchet wheel splined on said spindle to rotate same, an arm rotatable on said spindle adjacent to said ratchet wheel, a pawl pivoted on said arm and engaging said ratchet wheel, a rod pivoted to said arm at one end, an eccentric operatively supporting the other end of said rod, and motor driven means for operating said eccentric.

7. In a machine for extruding longitudinally striped rubber rope, an extruding head having a die orifice, an annular die driving member rotatably mounted on and encircling said head concentrically of the die orifice, an extrusion die rotatably mounted in said die orifice, means for feeding contrasting materials in converging paths to said die orifice, and means forming a detachable drive connection between said die-driving member and the die whereby the die may be changed without demounting said die-driving member, said detachable drive means including a sleeve member rotatably recessed into the die head concentrically of the die orifice and die-driving member and having the extruding die removably threaded thereinto and projecting therebeyond into the die orifice, and means forming a drive connection between said rotatable die-driving member and said sleeve.

JOHN H. JOHNSON.